United States Patent
Kashiwagi et al.

(10) Patent No.: US 12,155,975 B2
(45) Date of Patent: Nov. 26, 2024

(54) CONTROL METHOD FOR DISPLAY DEVICE AND DISPLAY DEVICE

(71) Applicant: SEIKO EPSON CORPORATION, Tokyo (JP)

(72) Inventors: Akihiro Kashiwagi, Azumino (JP); Takumi Takahashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 5 days.

(21) Appl. No.: 18/173,884

(22) Filed: Feb. 24, 2023

(65) Prior Publication Data

US 2023/0276033 A1    Aug. 31, 2023

(30) Foreign Application Priority Data

Feb. 25, 2022    (JP) .................................. 2022-027948

(51) Int. Cl.
*H04N 9/31* (2006.01)

(52) U.S. Cl.
CPC ......... *H04N 9/3141* (2013.01); *H04N 9/3179* (2013.01); *G09G 2320/0626* (2013.01)

(58) Field of Classification Search
CPC ......... G09G 2360/144; G09G 2360/16; G09G 2360/145; G09G 2320/0626; G09G 2320/0666; G09G 2320/0646; G09G 2320/066; G09G 2320/0673; G09G 2320/0233; G09G 2320/0271; G09G 2320/0276; G09G 2320/064; G09G 2320/0242; G09G 2320/0653; G09G 2320/0285; G09G 2320/041; G09G 2320/0686; G09G 2320/043; G09G 2320/0693; G09G 2320/0613; G09G 5/10;

(Continued)

(56) References Cited

U.S. PATENT DOCUMENTS

2006/0119564 A1    6/2006  Fry
2009/0079721 A1    3/2009  Gettemy (Continued)

FOREIGN PATENT DOCUMENTS

| JP | 2005-031572 A | 2/2005 |
| JP | 2012-198464 A | 10/2012 |
| JP | 2014-186071 A | 10/2014 |

OTHER PUBLICATIONS

"Choosing the Right Contrast Ratio for Your Meeting Room Projector". Barco Co. Ltd, Oct. 14, 2014.

*Primary Examiner* — Dong Hui Liang
(74) *Attorney, Agent, or Firm* — Oliff PLC (57) ABSTRACT

A control method for a display device includes: acquiring an output signal from a sensor detecting an illuminance in an environment where the display device is arranged; in a case where a first illuminance specified based on the output signal when a reference value of the illuminance in the environment is a first reference illuminance is higher than the first reference illuminance, changing the reference value from the first reference illuminance to a second reference illuminance that is higher than the first reference illuminance; and controlling a brightness of an image displayed on a display surface by the display device, based on a relationship between a second illuminance specified based on the output signal when the reference value is the second reference illuminance, and the second reference illuminance.

10 Claims, 6 Drawing Sheets

(58) Field of Classification Search
CPC .......... G09G 5/02; G09G 5/00; G09G 3/3406; G09G 3/20; G09G 3/2003; G09G 3/3413; G09G 3/3648; G09G 3/322; G09G 3/3208; G09G 3/3426; G09G 3/32; G09G 3/3611; G09G 3/3225; G09G 2354/00; G09G 2330/021; G09G 2340/06
See application file for complete search history.

(56) References Cited

U.S. PATENT DOCUMENTS

| | | | |
|---|---|---|---|
| 2010/0188325 A1 | 7/2010 | Inoue | |
| 2012/0242716 A1 | 9/2012 | Tanaka | |
| 2017/0011678 A1* | 1/2017 | Cao | G09G 3/2003 |
| 2018/0090045 A1* | 3/2018 | Li | G09G 3/2003 |
| 2020/0227005 A1* | 7/2020 | Zhang | H04M 1/725 |
| 2020/0372864 A1 | 11/2020 | Lee et al. | |
| 2021/0264876 A1* | 8/2021 | Peng | G09G 5/10 |

* cited by examiner

| R1 | R2 | R3 |
|---|---|---|
| ⇩ | ⇩ | ⇩ |
| E × 0.6 | E × 0.8 | E × 1.0 |

| R1 | R2 | R3 |
|---|---|---|
| ⇩ | ⇩ | ⇩ |
| E × 0.6 | E × 0.8 | E × 1.0 |

FIG. 11

CONTROL METHOD FOR DISPLAY DEVICE AND DISPLAY DEVICE

The present application is based on, and claims priority from JP Application Serial Number 2022-027948, filed Feb. 25, 2022, the disclosure of which is hereby incorporated by reference herein in its entirety.

BACKGROUND

1. Technical Field

The present disclosure relates to a control method for a display device, and a display device.

2. Related Art

JP-A-2005-31572 discloses a projector having a light sensor. The light sensor detects the brightness in the surroundings of the projector. The projector controls the brightness or the like of a projection image according to the result of the detection by the light sensor.

When the projector having the light sensor is arranged in an environment having a predetermined illuminance, the result of the detection by the light sensor may not show the predetermined illuminance, due to the positional relationship between a light source such as an illumination device and the light sensor or due to the individual specificity of the light sensor. When the result of the detection by the light sensor does not show the correct illuminance, there is a risk that the projector disclosed in JP-A-2005-31572 may not be able to project an image with a brightness corresponding to the actual illuminance in the environment. In this case, a problem arises in that the image is less visually recognizable. This problem can occur not only with the projector but also with a display device controlling the brightness of an image, based on an output signal from a light sensor.

SUMMARY

According to an aspect of the present disclosure, a control method for a display device includes: acquiring an output signal from a sensor detecting an illuminance in an environment where the display device is arranged; when a first illuminance specified based on the output signal from the sensor in a circumstance where a reference value of the illuminance in the environment is a first reference illuminance is higher than the first reference illuminance, changing the reference value from the first reference illuminance to a second reference illuminance that is higher than the first reference illuminance; and controlling a brightness of an image displayed on a display surface, based on a relationship between a second illuminance specified based on the output signal from the sensor in a circumstance where the reference value is the second reference illuminance, and the second reference illuminance.

According to another aspect of the present disclosure, a display device includes: a sensor outputting an output signal representing an illuminance in an environment where the display device is installed; and a processing device. The processing device executes: when a first illuminance specified based on the output signal in a circumstance where a reference value of the illuminance in the environment is a first reference illuminance is higher than the first reference illuminance, changing the reference value from the first reference illuminance to a second reference illuminance that is higher than the first reference illuminance; and controlling a brightness of an image displayed on a display surface, based on a relationship between a second illuminance specified based on the output signal in a circumstance where the reference value is the second reference illuminance, and the second reference illuminance.

DESCRIPTION OF EXEMPLARY EMBODIMENTS

A: First Embodiment

A1: Outline of Projector 1

Figure 1:
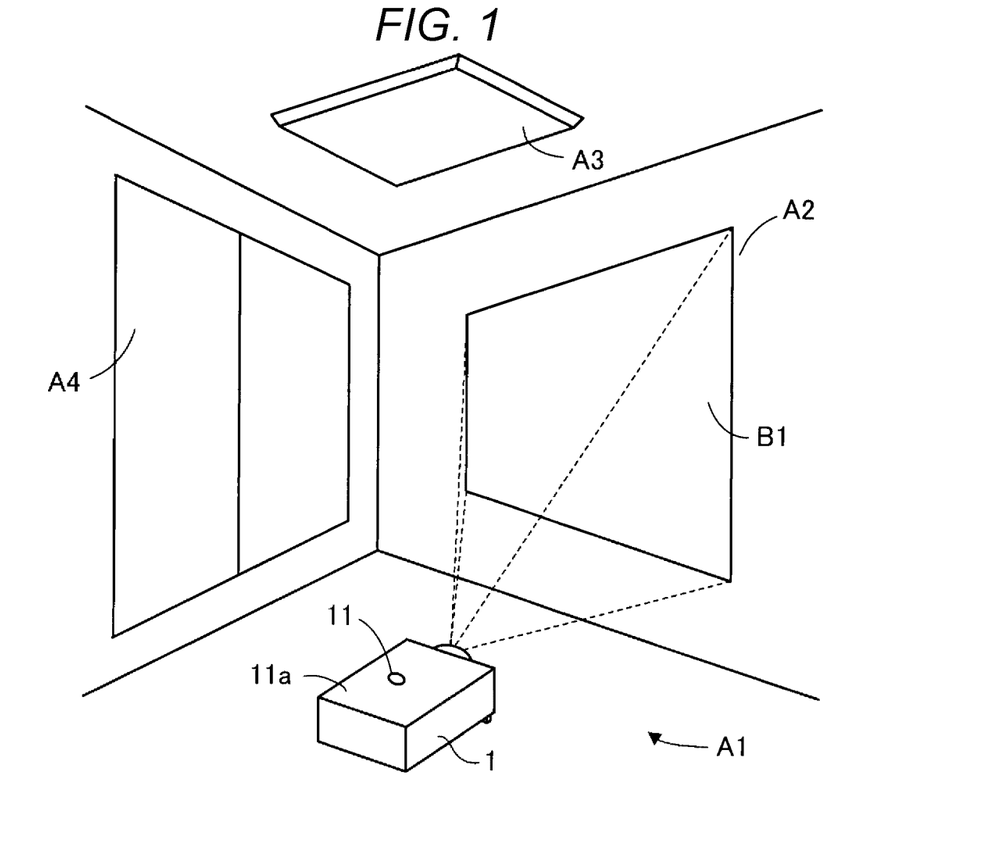
FIG. 1 is a schematic view of a projector 1.

FIG. 1 is a schematic view of the projector 1. The projector 1 is arranged in a room A1. The room A1 is, for example, a conference room, a living room, a bedroom, or a private room. The room A1 is an example of an environment where the projector 1 is arranged. The room A1 includes a wall A2, an illumination device A3, and a window A4. The room A1 may not include the window A4.

The projector 1 projects an image B1 onto the wall A2 and thus displays the image B1 on the wall A2.

The projector 1 is an example of a display device. The display device is not limited to the projector 1. The display device may be, for example, a display such as an FPD (flat panel display). The FPD is, for example, a liquid crystal display, a plasma display, or an organic EL (electroluminescence) display.

The wall A2 is an example of a display surface. The display surface is not limited to the wall A2. The display surface may be, for example, a screen, a ceiling, a corridor, or a merchandise. When the display device is a display, a screen where an image is displayed in the display is an example of the display surface.

The projector 1 includes a sensor 11. The sensor 11 is an illuminance sensor. The sensor 11 is not limited to the illuminance sensor. The sensor 11 may be, for example, a camera. The sensor 11 is located at a top surface 11a of the projector 1. The position of the sensor 11 is not limited to the position shown in FIG. 1 and can be changed according to need. The sensor 11 detects the illuminance in the room A1. The sensor 11 outputs an illuminance signal C1. The illuminance signal C1 is a signal representing the result of the detection of the illuminance in the room A1. The illuminance signal C1 is an example of an output signal from the sensor 11.

The projector 1 controls the brightness of the image B1 according to the illuminance in the room A1. For example, the projector 1 makes the image B1 darker as the illuminance in the room A1 becomes lower. In an example, the projector 1 controls the brightness of the image B1 in such a way that the illuminance in the room A1 and the illuminance on the wall A2, where the image B1 is projected, are in the relationship of 1:7.

The projector 1 controls the brightness of the image B1, based on the relationship between the illuminance in the room A1 and a reference value D of illuminance. The reference value D of illuminance is, for example, an upper limit value that is conceivable as the illuminance in the room A1. The reference value D of illuminance is not limited to the upper limit value that is conceivable as the illuminance in the room A1, and can be changed according to need.

The projector 1 sets two thresholds Da based on the reference value D of illuminance. The two thresholds Da are an example of one or more thresholds. The one or more thresholds are not limited to the two thresholds Da and may be, for example, one threshold, or three or more thresholds.

The two thresholds Da include a first threshold Da1 and a second threshold Da2. The first threshold Da1 is a value that is 10% of the reference value D of illuminance. The second threshold Da2 is a value that is 50% of the reference value D of illuminance. The relationship between the first threshold Da1 and the reference value D of illuminance and the relationship between the second threshold Da2 and the reference value D of illuminance are not limited to the foregoing relationships and can be changed according to need.

The projector 1 controls the brightness of the image B1, based on the high-low relationship between the two thresholds Da and the illuminance in the room A1. The projector 1 includes a light source 121 for projecting the image B1, as described later. The projector 1 controls the luminance of the light source 121 and thus controls the brightness of the image B1.

Figure 2:
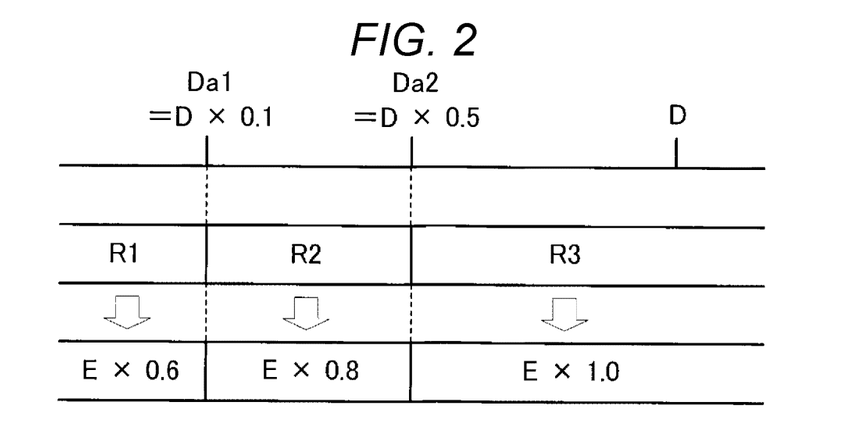
FIG. 2 shows the relationship between the illuminance in a room A1 and the luminance of a light source 121 in design.

FIG. 2 shows an example of the relationship between the illuminance in the room A1 and the luminance of the light source 121 in design. The relationship between the illuminance in the room A1 and the luminance of the light source 121 in design is not limited to the relationship shown in FIG. 2 and can be changed according to need. In FIG. 2, the reference value D of illuminance is, for example, 100 lx. When the reference value D of illuminance is 100 lx, the first threshold Da1 is 10 lx because the first threshold Da1 is a value that is 10% of the reference value D of illuminance. When the reference value D of illuminance is 100 lx, the second threshold Da2 is 50 lx because the second threshold Da2 is a value that is 50% of the reference value D of illuminance. The reference value D of illuminance is not limited to 100 lx and can be changed according to need.

FIG. 2 also shows a first range R1, a second range R2, a third range R3, and a maximum luminance E. The first range R1 is a range of illuminance equal to and lower than the first threshold Da1. The second range R2 is a range of illuminance higher than the first threshold Da1 and equal to and lower than the second threshold Da2. The third range R3 is a range of illuminance higher than the second threshold Da2. The maximum luminance E is the maximum luminance of the light source 121.

When the illuminance in the room A1 is included in the first range R1, the luminance of the light source 121 is set to be 60% of the maximum luminance E. When the illuminance in the room A1 is included in the second range R2, the luminance of the light source 121 is set to be 80% of the maximum luminance E. When the illuminance in the room A1 is included in the third range R3, the luminance of the light source 121 is set to be 100% of the maximum luminance E.

The projector 1 decides an illuminance F represented by the illuminance signal C1 outputted from the sensor 11, as the illuminance in the room A1. However, the illuminance F represented by the illuminance signal C1 changes, for example, according to the positional relationship between the sensor 11 and the illumination device A3. Therefore, the illuminance F represented by the illuminance signal C1 may not represent the actual illuminance in the room A1.

Figure 3:
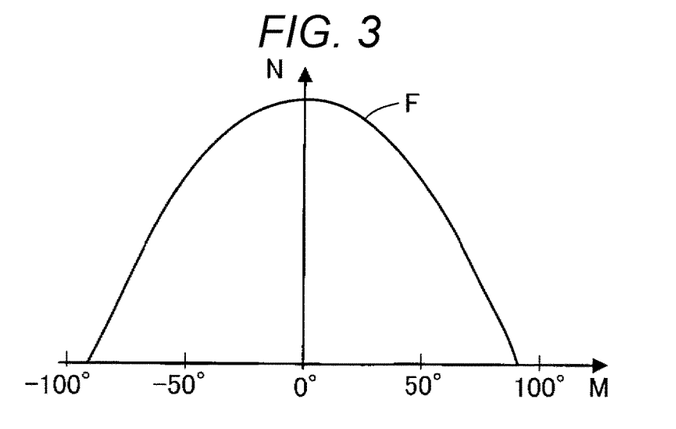
FIG. 3 shows the relationship between an angle of incidence M of light on a sensor 11 and an illuminance F.

FIG. 3 shows the relationship between an angle of incidence M of light on the sensor 11 and the illuminance F represented by the illuminance signal C1. In FIG. 3, the vertical axis represents the illuminance N and the horizontal axis represents the angle of incidence M. As shown in FIG. 3, the illuminance F represented by the illuminance signal C1 changes according to the angle of incidence M of light on the sensor 11. For example, the illuminance F represented by the illuminance signal C1 becomes higher as the absolute value of the angle of incidence M of light on the sensor 11 becomes smaller. Therefore, when the angle of incidence M of light on the sensor 11 is 0 degrees, the illuminance F represented by the illuminance signal C1 may be higher than the illuminance in the room A1.

The illuminance F represented by the illuminance signal C1 also changes according to the distance between the sensor 11 and the illumination device A3. For example, the illuminance F represented by the illuminance signal C1 becomes higher as the distance between the sensor 11 and the illumination device A3 becomes shorter. Therefore, when the sensor 11 is located near the illumination device A3, the illuminance F represented by the illuminance signal C1 may be higher than the illuminance in the room A1.

Also, when the sensor 11 receives sunlight via the window A4, the illuminance F represented by the illuminance signal C1 may be higher than the illuminance in the room A1.

The illuminance F represented by the illuminance signal C1 may become higher than the illuminance in the room A1, due to the individual specificity of the sensor 11.

Accordingly, the projector 1 increases the reference value D of illuminance when the illuminance F represented by the illuminance signal C1 may be higher than the illuminance in the room A1. Therefore, even when the illuminance F represented by the illuminance signal C1 is higher than the actual illuminance in the room A1, the relative relationship between the illuminance F represented by the illuminance signal C1 and the reference value D of illuminance can be maintained. Thus, even when the illuminance F represented by the illuminance signal C1 is higher than the actual illuminance in the room A1, the projector 1 can control the brightness of the image B1 similarly to when the illuminance F represented by the illuminance signal C1 is the actual illuminance in the room A1.

A2: Example of Projector 1

Figure 4:
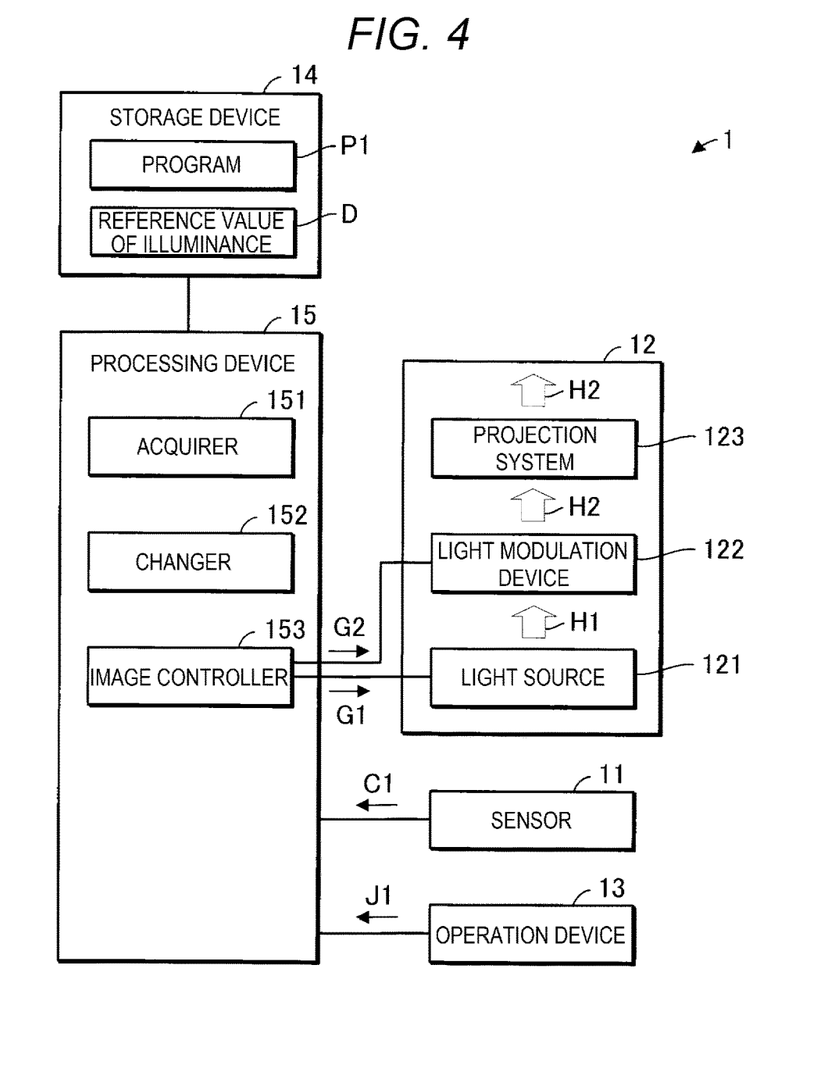
FIG. 4 shows an example of the projector 1.

FIG. 4 shows an example of the projector 1. The projector 1 includes an image projection device 12, an operation device 13, a storage device 14, and a processing device 15, in addition to the sensor 11.

The image projection device 12 projects the image B1. The image projection device 12 includes the light source 121, a light modulation device 122, and a projection system 123.

The light source 121 includes an LED (light-emitting diode). The light source 121 may include, for example, a xenon lamp, an ultra-high-pressure mercury lamp, or a laser light source, instead of the LED. The light source 121 emits light H1 based on a luminance signal G1 provided from the processing device 15. The luminance signal G1 is a signal designating the luminance of the light source 121. The light source 121 emits light with the luminance designated by the luminance signal G1 and thus emits the light H1.

The light modulation device 122 includes a liquid crystal light valve. The light modulation device 122 may include a DMD (digital mirror device) instead of the liquid crystal light valve. The light modulation device 122 modulates the light H1, based on an image signal G2 provided from the processing device 15, and thus generates image light H2. The image signal G2 is a signal representing the image B1. The image light H2 is light representing the image B1.

The projection system 123 includes one or a plurality of lenses. The projection system 123 projects the image light H2 onto the wall A2 and thus displays the image B1 on the wall A2.

The operation device 13 includes various operation buttons and operation keys or a touch panel. The operation device 13 accepts an input operation from a user. The operation device 13 may be a remote controller transmitting information based on the input operation, wirelessly or via a wire. In this case, the projector 1 includes a receiver receiving the information from the remote controller. The remote controller has various operation buttons, operation keys or a touch panel for accepting the input operation. The operation device 13 outputs an operation signal J1. The operation signal J1 is a signal representing the input operation.

The storage device 14 is a computer-readable recording medium. The storage device 14 includes a non-volatile memory and a volatile memory. The non-volatile memory is, for example, a ROM (read-only memory), an EPROM (erasable programmable read-only memory), and an EEPROM (electrically erasable programmable read-only memory). The volatile memory is, for example, a RAM (random-access memory).

The storage device 14 stores the reference value D of illuminance and a program P1. The program P1 defines operations of the projector 1. The storage device 14 may store the program P1 read from a storage device in a server, not illustrated. In this case, the storage device in the server is an example of a computer-readable recording medium.

The processing device 15 includes one or a plurality of CPUs (central processing units). The one or a plurality of CPUs is an example of one or a plurality of processors. Each of the processing device 15, the processor, and the CPU is an example of a computer. The processing device 15 is an example of a controller.

The processing device 15 reads the program P1 from the storage device 14. The processing device 15 executes the program P1 and thus functions as an acquirer 151, a changer 152, and an image controller 153. At least one of the acquirer 151, the changer 152, and the image controller 153 may be formed of a circuit such as a DSP (digital signal processor) and an ASIC (application-specific integrated circuit).

The acquirer 151 acquires the illuminance signal C1. For example, when the operation signal J1 indicating the power-on of the projector 1 is outputted from the operation device 13, the acquirer 151 acquires the illuminance signal C1 outputted from the sensor 11. The acquirer 151 provides the illuminance signal C1 to the changer 152 and the image controller 153.

The changer 152 changes the reference value D of illuminance, based on the illuminance F represented by the illuminance signal C1. For example, when a first illuminance F1 represented by the illuminance signal C1 in the circumstance where the reference value D of illuminance is a first reference illuminance D1 is higher than the first reference illuminance D1, the changer 152 changes the reference value D of illuminance from the first reference illuminance D1 to a second reference illuminance D2 that is higher than the first reference illuminance D1. The first reference illuminance D1 is, for example, an upper limit value that is conceivable as the illuminance in the room A1. The first reference illuminance D1 is, for example, 100 lx. The first reference illuminance D1 is not limited to 100 lx. The first reference illuminance D1 may be an illuminance lower than 100 lx or an illuminance higher than 100 lx. The first reference illuminance D1 may be changed according to the direction of the projector 1. The first reference illuminance D1 is 100 lx, for example, when the projector 1 is placed on the floor, and 300 lx when the projector 1 is suspended from the ceiling. The first illuminance F1 is the illuminance F represented by the illuminance signal C1 outputted from the sensor 11 in the circumstance where the reference value D of illuminance is the first reference illuminance D1.

The circumstance where the first illuminance F1 is higher than the first reference illuminance D1 occurs, for example, when the sensor 11 receives sunlight and when the sensor 11 is a sensor outputting the illuminance signal C1 representing an illuminance higher than the actual illuminance of a detection target. In this case, the first illuminance F1 represented by the illuminance signal C1 from the sensor 11 is higher than the actual illuminance in the room A1. In this case, the changer 152 changes the reference value D of illuminance from the first reference illuminance D1 to the second reference illuminance D2, which is higher than the first reference illuminance D1.

An example of the second reference illuminance D2 is a limit value of the reference value D of illuminance, that is, an upper limit value of the reference value D of illuminance. Hereinafter, the limit value of the reference value D of illuminance is referred to as a third reference illuminance D3. The third reference illuminance D3 is an illuminance higher than the first reference illuminance D1. The third reference illuminance D3 is, for example, 600 lx. The third reference illuminance D3 is not limited to 600 lx and may be any illuminance higher than the first reference illuminance D1. When the first illuminance F1 is equal to or higher than the third reference illuminance D3, the changer 152 changes the reference value D of illuminance from the first reference illuminance D1 to the third reference illuminance D3.

Another example of the second reference illuminance D2 is the first illuminance F1 higher than the first reference illuminance D1 and lower than the third reference illuminance D3. When the first illuminance F1 is higher than the first reference illuminance D1 and lower than the third reference illuminance D3, the changer 152 changes the reference value D of illuminance from the first reference illuminance D1 to the first illuminance F1. In this case, the first illuminance F1 is an example of an illuminance between the first reference illuminance D1 and the third reference illuminance D3. The illuminance between the first reference illuminance D1 and the third reference illuminance D3 is not limited to the first illuminance F1 and may be an illuminance between the first reference illuminance D1 and the first illuminance F1 or an illuminance between the first illuminance F1 and the third reference illuminance D3.

Meanwhile, when the first illuminance F1 is equal to or lower than the first reference illuminance D1, the changer 152 does not change the reference value D of illuminance and maintains the circumstance where the reference value D of illuminance is the first reference illuminance D1.

The image controller 153 controls the brightness of the image B1, based on the relationship between the reference value D of illuminance and the illuminance F represented by the illuminance signal C1. For example, the image controller 153 controls the brightness of the image B1, based on the relative relationship between the reference value D of illuminance and the illuminance F represented by the illuminance signal C1.

For example, the image controller 153 controls the brightness of the image B1, based on the high-low relationship between one or more thresholds Da specified based on the reference value D of illuminance, and the illuminance F represented by the illuminance signal C1.

In an example, the image controller 153 first sets two thresholds Da on the reference value D of illuminance. The two thresholds Da are an example of the one or more thresholds Da. The two thresholds Da are, for example, the first threshold Da1 and the second threshold Da2 shown in FIG. 2. The image controller 153 then controls the brightness of the image B1 displayed on the wall A2, based on the high-low relationship between the illuminance F represented by the illuminance signal C1 and the two thresholds Da.

For example, in the circumstance where the reference value D of illuminance is the second reference illuminance D2, the image controller 153 controls the brightness of the image B1 displayed on the wall A2, based on the high-low relationship between the two thresholds Da based on the second reference illuminance D2 and a second illuminance F2 represented by the illuminance signal C1. The second illuminance F2 is the illuminance F represented by the illuminance signal C1 outputted from the sensor 11 in the circumstance where the reference value D of illuminance is the second reference illuminance D2.

Meanwhile, in the circumstance where the reference value D of illuminance is the first reference illuminance D1, the image controller 153 controls the brightness of the image B1 displayed on the wall A2, based on the high-low relationship between the two thresholds Da based on the first reference illuminance D1 and a third illuminance F3 represented by the illuminance signal C1. The third illuminance F3 is the illuminance F represented by the illuminance signal C1 outputted from the sensor 11 in the circumstance where the reference value D of illuminance is maintained at the first reference illuminance D1.

The image controller 153 controls the luminance of the light source 121 as shown in FIG. 2, based on the high-low relationship between the illuminance F represented by the illuminance signal C1 and the two thresholds Da, and thus controls the brightness of the image B1.

For example, the image controller 153 sets the luminance of the light source 121 designated by the luminance signal G1, as shown in FIG. 2, based on the high-low relationship between the illuminance F represented by the illuminance signal C1 and the two thresholds Da. The image controller 153 provides the luminance signal G1 set as shown in FIG. 2, to the image projection device 12, and thus controls the brightness of the image B1. The image controller 153 may adjust the image signal G2 instead of the luminance signal G1 and thus may control the brightness of the image B1. The image controller 153 may adjust both of the luminance signal G1 and the image signal G2 and thus may control the brightness of the image B1.

A3: Outline of Operations

Figure 5:
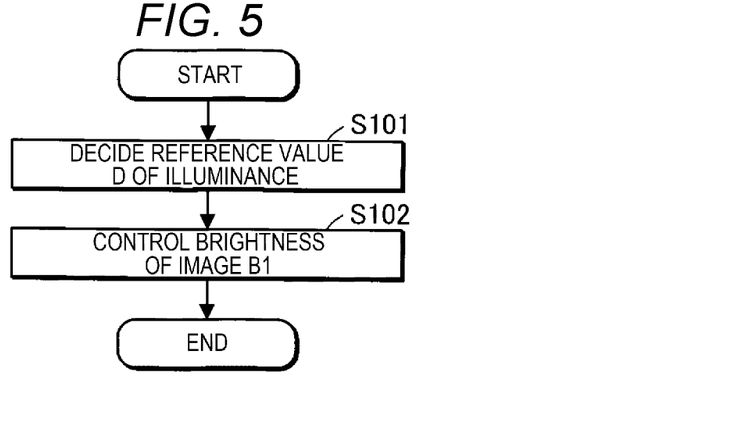
FIG. 5 explains an outline of operations of the projector 1.

FIG. 5 explains an outline of operations of the projector 1.

In step S101, the projector 1 decides the reference value D of illuminance, based on the illuminance F represented by the illuminance signal C1.

Then, in step S102, the projector 1 controls the brightness of the image B1, based on the relative relationship between the illuminance F represented by the illuminance signal C1 and the reference value D of illuminance.

A4: An Example of Operation of Deciding Reference Value D of Illuminance

Figure 6:
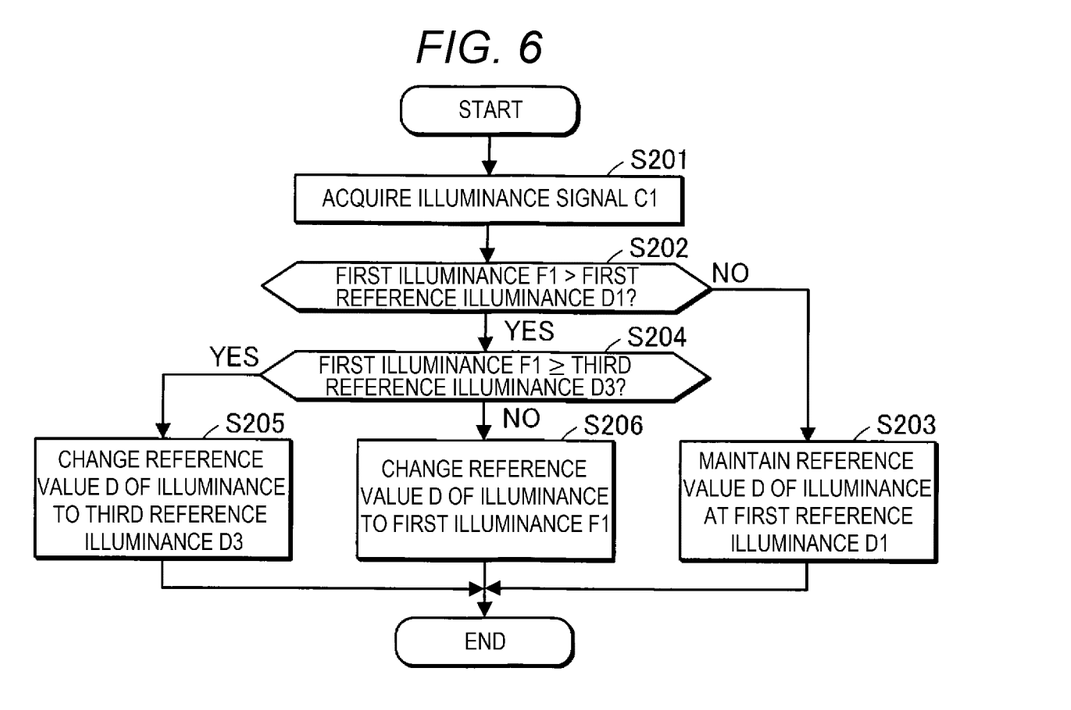
FIG. 6 shows an example of an operation of deciding a reference value D of illuminance.

FIG. 6 shows an example of the operation of deciding the reference value D of illuminance in step S101 in FIG. 5. At the start of the processing shown in FIG. 6, the first reference illuminance D1 is set as the reference value D of illuminance.

As the acquirer 151 acquires the operation signal J1 representing the power-on of the projector 1 from the operation device 13, the acquirer 151 acquires the illuminance signal C1 in step S201. The acquirer 151 provides the illuminance signal C1 to the changer 152.

As the changer 152 receives the illuminance signal C1, the changer 152 executes step S202. In step S202, the changer 152 determines whether the first illuminance F1 represented by the illuminance signal C1 outputted from the sensor 11 in the circumstance where the reference value D of illuminance is the first reference illuminance D1 is higher than the first reference illuminance D1 or not.

When the changer 152 determines in step S202 that the first illuminance F1 is equal to or lower than the first reference illuminance D1, the changer 152 in step S203 maintains the reference value D of illuminance at the first reference illuminance D1. That is, the changer 152 decides the first reference illuminance D1 as the reference value D of illuminance.

When the changer 152 determines in step S202 that the first illuminance F1 is higher than the first reference illuminance D1, the changer 152 in step S204 determines whether the first illuminance F1 is equal to or higher than the third reference illuminance D3 or not.

When the changer 152 determines in step S204 that the first illuminance F1 is equal to or higher than the third reference illuminance D3, the changer 152 in step S205 changes the reference value D of illuminance from the first reference illuminance D1 to the third reference illuminance D3. That is, the changer 152 decides the third reference illuminance D3 as the reference value D of illuminance.

When the changer 152 determines in step S204 that the first illuminance F1 is lower than the third reference illuminance D3, the changer 152 in step S206 changes the reference value D of illuminance from the first reference illuminance D1 to the first illuminance F1. That is, the changer 152 decides the first illuminance F1 as the reference value D of illuminance.

A5: An Example of Operation of Controlling Brightness of Image B1

Figure 7:
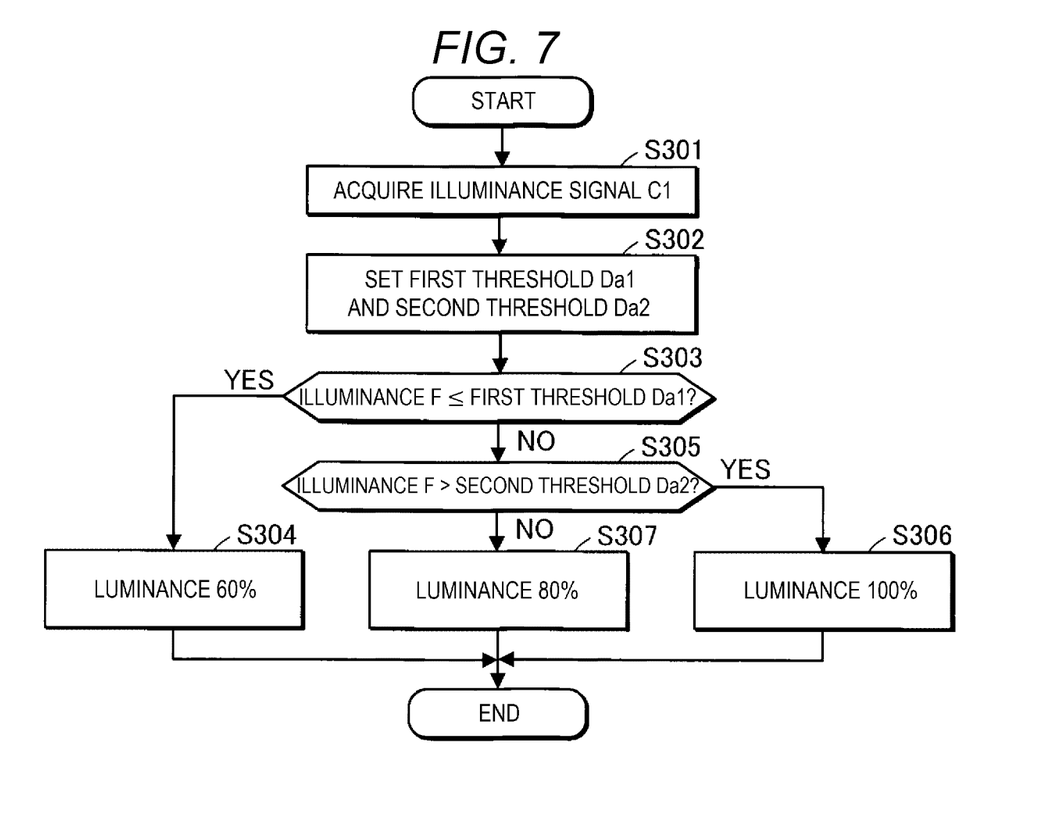
FIG. 7 shows an example of an operation of controlling the brightness of an image B1.

FIG. 7 shows an example of the operation of controlling the brightness of the image B1 in step S102 in FIG. 5. The first reference illuminance D1 is 100 lx. The third reference illuminance D3 is 600 lx.

In step S301, the acquirer 151 acquires the illuminance signal C1. The acquirer 151 provides the illuminance signal C1 to the image controller 153.

As the image controller 153 receives the illuminance signal C1, the image controller 153 executes step S302. In step S302, the image controller 153 sets the first threshold Da1 and the second threshold Da2, based on the reference value D of illuminance. The first threshold Da1 is a value that is 10% of the reference value D of illuminance. The second threshold Da2 is a value that is 50% of the reference value D of illuminance.

Figure 8:
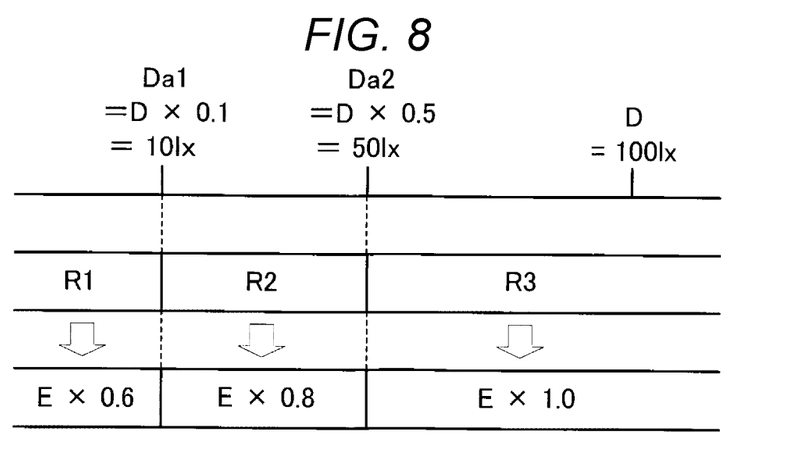
FIG. 8 shows an example of a first threshold Da1 and a second threshold Da2.

FIG. 8 shows an example of the first threshold Da1 and the second threshold Da2 set when the reference value D of illuminance is maintained at the first reference illuminance D1. The circumstance where the reference value D of illuminance is maintained at the first reference illuminance D1 occurs, for example, when the illuminance signal C1 from the sensor 11 represents 100 lx in the circumstance where the actual illuminance in the room A1 is 100 lx. In FIG. 8, the reference value D of illuminance is maintained at the first reference illuminance D1 and therefore the reference value D of illuminance is 100 lx. The first threshold Da1 is a value that is 10% of the reference value D of illuminance and therefore is 10 lx. The second threshold Da2 is a value that is 50% of the reference value D of illuminance and therefore is 50 lx.

Figure 9:
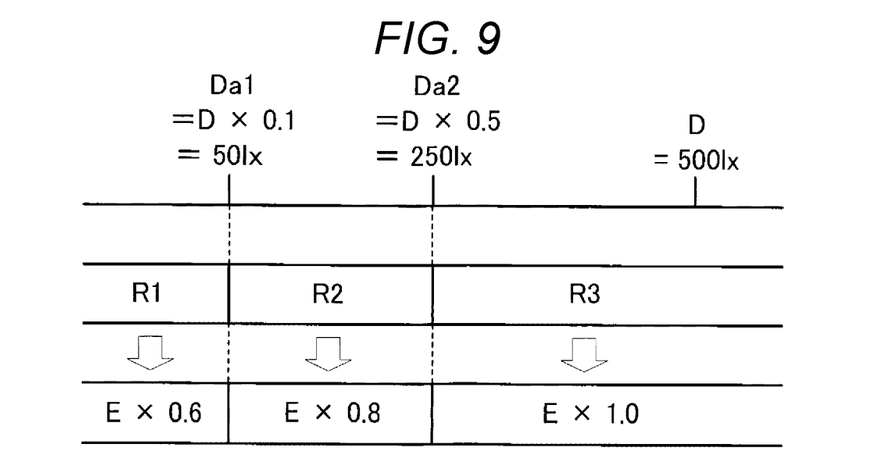
FIG. 9 shows another example of the first threshold Da1 and the second threshold Da2.

FIG. 9 shows an example of the first threshold Da1 and the second threshold Da2 set when the reference value D of illuminance is the first illuminance F1. The circumstance where the reference value D of illuminance is the first illuminance F1 occurs, for example, when, in the state where the actual illuminance in the room A1 is 100 lx, the illuminance signal C1 from the sensor 11 represents 500 lx, which is an illuminance five times the actual illuminance in the room A1. In FIG. 9, the first illuminance F1 is 500 lx, which is five times the first reference illuminance D1. In FIG. 9, the reference value D of illuminance is the first illuminance F1 and therefore the reference value D of illuminance is 500 lx. The first threshold Da1 is a value that is 10% of the reference value D of illuminance and therefore is 50 lx. The second threshold Da2 is a value that is 50% of the reference value D of illuminance and therefore is 250 lx.

The first threshold Da1 in FIG. 9 is five times the first threshold Da1 in FIG. 8. The second threshold Da2 in FIG. 9 is five times the second threshold Da2 in FIG. 8. Therefore, when the illuminance signal C1 represents an illuminance five times the actual illuminance in the room A1, the first threshold Da1 and the second threshold Da2 represent illuminances five times the first threshold Da1 and the second threshold Da2 set when the illuminance signal C1 represents the actual illuminance in the room A1. Thus, the relative relationship between the illuminance F represented by the illuminance signal C1, and the first threshold Da1 and the second threshold Da2, is maintained.

Figure 10:
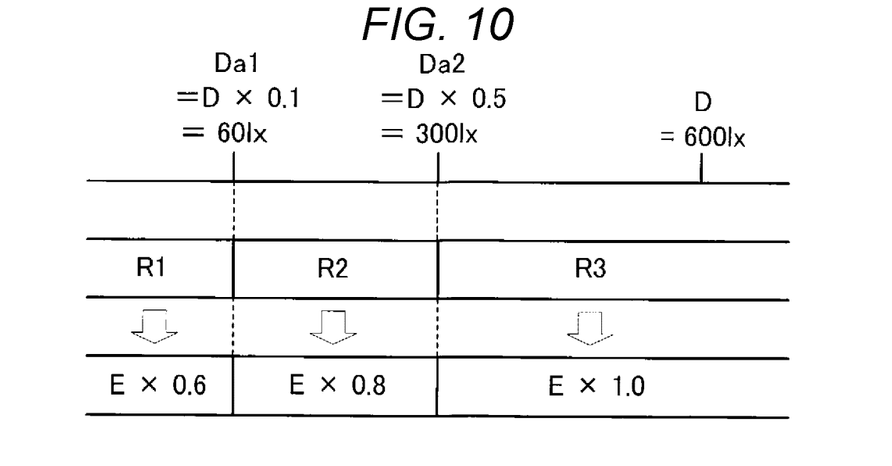
FIG. 10 shows still another example of the first threshold Da1 and the second threshold Da2.

FIG. 10 shows an example of the first threshold Da1 and the second threshold Da2 set when the reference value D of illuminance is the third reference illuminance D3. The circumstance where the reference value D of illuminance is the third reference illuminance D3 occurs, for example, when the sensor 11 outputs the illuminance signal C1 representing 1000 lx due to the entry of sunlight into the sensor 11 when the actual illuminance in the room A1 is 100 lx. In FIG. 10, the reference value D of illuminance is the third reference illuminance D3 and therefore the reference value D of illuminance is 600 lx. The first threshold Da1 is a value that is 10% of the reference value D of illuminance and therefore is 60 lx. The second threshold Da2 is a value that is 50% of the reference value D of illuminance and therefore is 300 lx. Since the reference value D of illuminance is set to be the third reference illuminance D3, the first threshold Da1 and the second threshold Da2 can be restrained from becoming excessively high.

The circumstance where the reference value D of illuminance is the first illuminance F1 and the circumstance where the reference value D of illuminance is the third reference illuminance D3 are an example of the circumstance where the reference value D of illuminance is the second reference illuminance D2. Hereinafter, to simplify the description, the circumstance where the reference value D of illuminance is the first illuminance F1 and the circumstance where the reference value D of illuminance is the third reference illuminance D3 are referred to as the circumstance where the reference value D of illuminance is the second reference illuminance D2. When the reference value D of illuminance is the third reference illuminance D3, the second reference illuminance D2 means the third reference illuminance D3. When the reference value D of illuminance is the first illuminance F1, the second reference illuminance D2 means the first illuminance F1.

In step S303 in FIG. 7, the image controller 153 determines whether the illuminance F represented by the illuminance signal C1 is equal to or lower than the first threshold Da1 or not. That is, the image controller 153 determines whether the illuminance F represented by the illuminance signal C1 is included in the first range R1 shown in FIG. 2 or not.

For example, when the reference value D of illuminance is the second reference illuminance D2, the image controller 153 determines whether the second illuminance F2 is equal to or lower than the first threshold Da1 or not. The second illuminance F2 is the illuminance F represented by the illuminance signal C1 outputted from the sensor 11 in the circumstance where the reference value D of illuminance is the second reference illuminance D2.

Meanwhile, when the reference value D of illuminance is the first reference illuminance D1, the image controller 153 determines whether the third illuminance F3 is equal to or lower than the first threshold Da1 or not. The third illuminance F3 is the illuminance F represented by the illuminance signal C1 outputted from the sensor 11 in the circumstance where the reference value D of illuminance is maintained at the first reference illuminance D1.

When the image controller 153 determines in step S303 that the illuminance F represented by the illuminance signal C1 is equal to or lower than the first threshold Da1, the image controller 153 in step S304 generates the luminance signal G1 designating a luminance that is 60% of the maximum luminance E of the light source 121. Subsequently, the image controller 153 provides the luminance signal G1 designating the luminance that is 60% of the maximum luminance E of the light source 121, and the image signal G2, to the image projection device 12. In the image projection device 12, the light source 121 emits the light H1 with the luminance that is 60% of the maximum luminance E, based on the luminance signal G1. The light modulation device 122 modulates the light H1 emitted from the light source 121, based on the image signal G2, and thus generates the image light H2. The projection system 123 projects the image light H2 onto the wall A2 and thus displays the image B1 on the wall A2.

When the image controller 153 determines in step S303 that the illuminance F represented by the illuminance signal C1 is higher than the first threshold Da1, the image controller 153 in step S305 determines whether the illuminance F represented by the illuminance signal C1 is higher than the second threshold Da2 or not. That is, the image controller 153 determines whether the illuminance F represented by the illuminance signal C1 is included in the third range R3 shown in FIG. 2 or not.

For example, when the reference value D of illuminance is the second reference illuminance D2, the image controller 153 determines whether the second illuminance F2 is higher than the second threshold Da2 or not. The second illuminance F2 is the illuminance F represented by the illuminance signal C1 outputted from the sensor 11 in the circumstance where the reference value D of illuminance is the second reference illuminance D2.

Meanwhile, when the reference value D of illuminance is the first reference illuminance D1, the image controller 153 determines whether the third illuminance F3 is higher than the second threshold Da2 or not. The third illuminance F3 is the illuminance F represented by the illuminance signal C1 outputted from the sensor 11 in the circumstance where the reference value D of illuminance is maintained at the first reference illuminance D1.

When the image controller 153 determines in step S305 that the illuminance F represented by the illuminance signal C1 is higher than the second threshold Da2, the image controller 153 in step S306 generates the luminance signal G1 designating a luminance that is 100% of the maximum luminance E of the light source 121. Subsequently, the image controller 153 provides the luminance signal G1 designating the luminance that is 100% of the maximum luminance E of the light source 121, and the image signal G2, to the image projection device 12. In the image projection device 12, the light source 121 emits the light H1 with the luminance that is 100% of the maximum luminance E, based on the luminance signal G1. The light modulation device 122 modulates the light H1 emitted from the light source 121, based on the image signal G2, and thus generates the image light H2. The projection system 123 projects the image light H2 onto the wall A2 and thus displays the image B1 on the wall A2.

When the image controller 153 determines in step S305 that the illuminance F represented by the illuminance signal C1 is equal to or lower than the second threshold Da2, the image controller 153 determines that the illuminance F represented by the illuminance signal C1 is included in the second range R2 shown in FIG. 2. Then, the image controller 153 generates the luminance signal G1 designating a luminance that is 80% of the maximum luminance E of the light source 121. Subsequently, the image controller 153 provides the luminance signal G1 designating the luminance that is 80% of the maximum luminance E of the light source 121, and the image signal G2, to the image projection device 12. In the image projection device 12, the light source 121 emits the light H1 with the luminance that is 80% of the maximum luminance E, based on the luminance signal G1. The light modulation device 122 modulates the light H1 emitted from the light source 121, based on the image signal G2, and thus generates the image light H2. The projection system 123 projects the image light H2 onto the wall A2 and thus displays the image B1 on the wall A2.

A6: Summary of First Embodiment

The control method for the projector 1 and the projector 1 according to the first embodiment include the aspects described below.

The control method for the projector 1 is executed by the processing device 15 of the projector 1. The processing device 15 functions as the acquirer 151, the changer 152, and the image controller 153. The acquirer 151 acquires the illuminance signal C1 outputted from the sensor 11 detecting the illuminance in the room A1, where the projector 1 is arranged. When the first illuminance F1 represented by the illuminance signal C1 from the sensor 11 in the circumstance where the reference value D of illuminance is the first reference illuminance D1 is higher than the first reference illuminance D1, the changer 152 changes the reference value D of illuminance from the first reference illuminance D1 to the second reference illuminance D2, which is higher than the first reference illuminance D1. The image controller 153 controls the brightness of the image B1 displayed on the wall A2, based on the relationship between the second illuminance F2 represented by the illuminance signal C1 from the sensor 11 in the circumstance where the reference value D of illuminance is the second reference illuminance D2, and the second reference illuminance D2.

According to this aspect, when the illuminance F represented by the illuminance signal C1 from the sensor 11 is higher than the actual illuminance in the room A1, the changer 152 increases the reference value D of illuminance. Therefore, even when the illuminance F is higher than the actual illuminance in the room A1, the relationship between the illuminance F and the reference value D of illuminance can be maintained. Thus, for example, even when the illuminance F is higher than the actual illuminance in the room A1, the brightness of the image B1 can be controlled similarly to when the illuminance F represents the actual illuminance in the room A1. Therefore, the image with the brightness corresponding to the actual illuminance in the environment where the projector 1 is installed can be displayed. Accordingly, the situation where the image becomes less visually recognizable due to the inability to display the image with the brightness corresponding to the actual illuminance in the environment where the projector 1 is installed, can be reduced.

A comparative example will now be described. In the comparative example, the reference value D of illuminance is fixed. That is, the reference value D of illuminance is not changed. Specifically, the reference value D of illuminance is fixed at 100 lx. Therefore, the first threshold Da1 is fixed at 10 lx. The second threshold Da2 is fixed at 50 lx.

In the comparative example, for example, when the sensor 11 outputs the illuminance signal C1 representing an illuminance five times the actual illuminance in the room A1, the following circumstance occurs.

When the actual illuminance in the room A1 is 2 lx, the illuminance signal C1 from the sensor 11 represents 10 lx. Therefore, for example, when the actual illuminance in the room A1 changes from an illuminance lower than 2 lx to an illuminance higher than 2 lx, the brightness of the image B1 increases. Accordingly, in practice, the first threshold Da1 is 2 lx instead of 10 lx. Meanwhile, when the actual illuminance in the room A1 is 10 lx, the illuminance signal C1 from the sensor 11 represents 50 lx. Therefore, for example, when the actual illuminance in the room A1 changes from an illuminance lower than 10 lx to an illuminance higher than 10 lx, the brightness of the image B1 increases. Accordingly, in practice, the second threshold Da2 is 10 lx instead of 50 lx.

In this way, when the sensor 11 outputs the illuminance signal C1 representing an illuminance higher than the actual illuminance in the room A1, the first threshold Da1 and the second threshold Da2 in practice are lower than the original values. For example, when the sensor 11 outputs the illuminance signal C1 representing an illuminance five times the actual illuminance in the room A1, the first threshold Da1 and the second threshold Da2 in practice are values one-fifth the original values. Therefore, when the illuminance in the room A1 does not become equal to or lower than 10 lx despite the execution of the processing of controlling the brightness of the image B1 shown in FIG. 7, a first problem arises in that the brightness of the image B1 is not adjusted.

Also the space between the first threshold Da1 and the second threshold Da2 is in practice narrower than the original space. For example, when the sensor 11 outputs the illuminance signal C1 representing an illuminance five times the actual illuminance in the room A1, the space between the first threshold Da1 and the second threshold Da2 is in practice one-fifth the original space.

The light reflected by the wall A2 reaches the sensor 11, too. Therefore, the illuminance F represented by the illuminance signal C1 from the sensor 11 changes according to the change in the brightness of the image B1 projected on the wall A2. When the space between the first threshold Da1 and the second threshold Da2 is too narrow, the illuminance F represented by the illuminance signal C1 may change within a range around the first threshold Da1 or the second threshold Da2 according to the change in the brightness of the image B1. In this case, a second problem arises in that the brightness of the image B1 is not stable.

In this respect, in this embodiment, when the illuminance F represented by the illuminance signal C1 from the sensor 11 is higher than the actual illuminance in the room A1, the changer 152 increases the reference value D of illuminance. Therefore, the occurrence of the first and second problems arising in the configuration where the reference value D of illuminance is fixed can be restrained.

Also, according to this embodiment, when the first illuminance F1 is equal to or higher than the third reference illuminance D3, which is higher than the first reference illuminance D1, the second reference illuminance D2 is the third reference illuminance D3. When the first illuminance F1 is higher than the first reference illuminance D1 and lower than the third reference illuminance D3, the second reference illuminance D2 is an illuminance between the first reference illuminance D1 and the third reference illuminance D3.

According to this aspect, the third reference illuminance D3 can be defined as the upper limit of the reference value D of illuminance. Therefore, the reference value D of illuminance can be restrained from becoming excessively high, compared with the configuration where the second reference illuminance D2 is the first illuminance F1 when the first illuminance F1 is equal to or higher than the third reference illuminance D3.

Also, according to this embodiment, the image controller 153 sets the two thresholds Da, that is, the first threshold Da1 and the second threshold Da2, based on the second reference illuminance D2. The image controller 153 controls the brightness of the image B1, based on the high-low relationship between the two thresholds Da and the second illuminance F2.

According to this aspect, a plurality of thresholds are changed according to the change in one reference value D of illuminance. Therefore, a plurality of thresholds can be more easily changed than in the configuration where the plurality of thresholds are individually changed.

In this embodiment, the two thresholds Da are an example of the one or more thresholds Da. The high-low relationship between the one or more thresholds Da and the second illuminance F2 is an example of the relationship between the second illuminance F2 and the second reference illuminance D2. The relationship between the second illuminance F2 and the second reference illuminance D2 is not limited to the high-low relationship between the one or more thresholds Da and the second illuminance F2. For example, the relationship between the second illuminance F2 and the second reference illuminance D2 may be the ratio of the second illuminance F2 to the second reference illuminance D2. In this case, the image controller 153 makes the image B1 brighter as the ratio of the second illuminance F2 to the second reference illuminance D2 becomes higher.

Also, according to this embodiment, the acquirer 151 and the changer 152 automatically start the operation of deciding the reference value D of illuminance in response to the power-on of the projector 1.

According to this aspect, the burden of the operation on the user can be reduced, compared with the configuration where the operation of deciding the reference value D of illuminance is manually started.

B: Modification Examples

Modification aspects of the foregoing embodiment will now be described. Two or more aspects arbitrarily selected from the aspects described below may be combined together where appropriate within a range that does not make these aspects contradictory to each other.

B1: First Modification Example

In the first embodiment, the third reference illuminance D3, which is the upper limit of the reference value D of illuminance, may be omitted. In this case, for example, the first illuminance F1 is used as the second reference illuminance D2. That is, the second reference illuminance D2 may be defined to be the first illuminance F1. For example, when the first illuminance F1 is higher than the first reference illuminance D1, the changer 152 changes the reference value D from the first reference illuminance D1 to the first illuminance F1.

The first modification example can eliminate the need for the third reference illuminance D3 and therefore can eliminate the need for the processing of comparing the third reference illuminance D3 and the first illuminance F1.

B2: Second Modification Example

In the first embodiment and the first modification example, the operation device 13 may accept a first start instruction designating the start of the operation of deciding the reference value D of illuminance. The acquirer 151 and the changer 152 may start the operation of deciding the reference value D of illuminance in response to the operation device 13 accepting the first start instruction. In this case, the image controller 153 may execute the operation of controlling the brightness of the image B1, following the operation of deciding the reference value D of illuminance in response to the acceptance of the first start instruction.

According to the second modification example, the user can input the first start instruction to the operation device 13 and thus can execute the operation of deciding the reference value D of illuminance at a timing preferred by the user.

B3: Third Modification Example

In the first embodiment and the first and second modification examples, the operation device 13 may accept a second start instruction designating the start of the operation of controlling the brightness of the image B1. The acquirer 151 and the changer 152 may start the operation of deciding the reference value D of illuminance in response to the operation device 13 accepting the second start instruction. In this case, the image controller 153 may execute the operation of controlling the brightness of the image B1, following the operation of deciding the reference value D of illuminance in response to the acceptance of the second start instruction.

According to the third modification example, the user can input the second start instruction to the operation device 13 and thus can execute the operation of deciding the reference value D of illuminance at a timing preferred by the user.

B4: Fourth Modification Example

In the first embodiment and the first to third modification examples, the illuminance F represented by the illuminance signal C1 from the sensor 11 is used as an example of the illuminance specified based on the illuminance signal C1 from the sensor 11. For example, the first illuminance F1, the second illuminance F2, and the third illuminance F3 are an example of the illuminance specified based on the illuminance signal C1 from the sensor 11.

However, the illuminance specified based on the illuminance signal C1 from the sensor 11 is not limited to the illuminance F represented by the illuminance signal C1 from the sensor 11. For example, the illuminance specified based on the illuminance signal C1 from the sensor 11 may be an illuminance specified based on a plurality of illuminances acquired from the illuminance signal C1 representing an illuminance in time series.

For example, the acquirer 151 acquires an illuminance three times at an interval of one second from the illuminance signal C1 representing an illuminance in time series. The time interval at which the illuminance is acquired is not limited to the interval of one second and can be changed according to need. The number of illuminances acquired from the illuminance signal C1 is not limited to three and may be two or an integer equal to or greater than four. The acquirer 151 provides the three illuminances acquired in the three times of acquisition, to the changer 152 and the image controller 153.

The changer 152 specifies the first illuminance F1, based on the three illuminances. For example, the changer 152 specifies the average value of the three illuminances as the first illuminance F1. In the configuration where the average value of the three illuminances is specified as the first illuminance F1, for example, even when one illuminance of the three illuminances includes a noise, the influence of the noise can be reduced, compared with the configuration where the one illuminance including the noise is used as the first illuminance F1.

The changer 152 may specify the lowest illuminance of the three illuminances as the first illuminance F1. In the configuration where the lowest illuminance of the three illuminances is specified as the first illuminance F1, for example, even when one illuminance of the three illuminances is an excessively high illuminance due to sunlight, the influence of the excessively high illuminance on the first illuminance F1 can be eliminated.

The changer 152 may specify the highest illuminance of the three illuminances as the first illuminance F1. In the configuration where the highest illuminance of the three illuminances is specified as the first illuminance F1, for example, even when one illuminance of the three illuminances is an excessively low illuminance because the sensor 11 is covered with an object such as a hand, the influence of the excessively low illuminance on the first illuminance F1 can be eliminated.

The image controller 153 may specify the second illuminance F2 or the third illuminance F3, based on the three illuminances. The technique in which the image controller 153 specifies the second illuminance F2 or the third illuminance F3, based on the three illuminances, is similar to, for example, the technique in which the changer 152 specifies the first illuminance F1, based on the three illuminances. The changer 152 may specify the average value of the three illuminances as the first illuminance F1 and the image controller 153 may specify the lowest illuminance or the highest illuminance of the three illuminances as the second illuminance F2 or the third illuminance F3. Also, the changer 152 may specify the lowest illuminance of the three illuminances as the first illuminance F1 and the image controller 153 may specify the highest illuminance of the three illuminances or the average illuminance of the three illuminances as the second illuminance F2 or the third illuminance F3. Also, the changer 152 may specify the highest illuminance of the three illuminances as the first illuminance F1 and the image controller 153 may specify the lowest illuminance of the three illuminances or the average illuminance of the three illuminances as the second illuminance F2 or the third illuminance F3.

The fourth modification example can improve the reliability of the illuminance specified based on the illuminance signal C1 from the sensor 11.

B5: Fifth Modification Example

As described above, the illuminance F represented by the illuminance signal C1 from the sensor 11 changes, for example, according to the change in the positional relationship between the sensor 11 located in the projector 1 and the illumination device A3. Thus, when the projector 1 is used in another room after the use in the room A1, the positional relationship between the projector 1 and the illumination device A3 changes and therefore it is desirable to reset the reference value D of illuminance. Also, when the positional relationship between the projector 1 and the illumination device A3 changes in the state where the projector 1 is located in the room A1, it is desirable to reset the reference value D of illuminance. The reset of the reference value D of illuminance is the processing of returning the reference value D of illuminance from the second reference illuminance D2 to the first reference illuminance D1.

In the first embodiment and the first to fourth modification examples, the reset of the reference value D of illuminance may be executed in response to an operation from the user. For example, the changer 152 may change the reference value D of illuminance from the second reference illuminance D2 to the first reference illuminance D1 in response to the operation device 13 accepting an operation representing the reset of the reference value D of illuminance.

Also, the changer 152 may automatically reset the reference value D of illuminance. For example, when the projector 1 is moved from the room A1 to another room, it is likely that the power of the projector 1 is turned off in the room A1 and subsequently turned on in the room of destination. Therefore, the changer 152 may change the reference value D of illuminance from the second reference illuminance D2 to the first reference illuminance D1 in response to the power-on or power-off of the projector 1 in the circumstance where the reference value D of illuminance is the second reference illuminance D2.

In an example, the changer 152 changes the reference value D of illuminance from the second reference illuminance D2 to the first reference illuminance D1 in response to the operation device 13 accepting an operation for the power-on of the projector 1 in the circumstance where the reference value D of illuminance is the second reference illuminance D2. Also, the changer 152 changes the reference value D of illuminance from the second reference illuminance D2 to the first reference illuminance D1 in response to the operation device 13 accepting an operation for the power-off of the projector 1 in the circumstance where the reference value D of illuminance is the second reference illuminance D2.

The changer 152 may execute the operation of automatically resetting the reference value D of illuminance in response to the start of the image display by the projector 1 or the stop of the image display by the projector 1. For example, in the case where the projector 1 is set in a mute state or a pause state in order for the projector 1 to stop displaying the image B1 in the room A1 and the mute state or the pause state of the projector 1 is cancelled after the lapse of a predetermined time in order for the projector 1 to start displaying the image B1, it is likely that the illuminance in the room A1 changes with the lapse of time due to sunlight. Therefore, the changer 152 may change the reference value D of illuminance from the second reference illuminance D2 to the first reference illuminance D1 in response to the setting or cancellation of the mute state or the pause state of the projector 1 in the circumstance where the reference value D of illuminance is the second reference illuminance D2.

According to this aspect, the reference value D of illuminance is changed from the second reference illuminance D2 to the first reference illuminance D1 in response to the power-on or power-off of the projector 1, or the start of the image display or the stop of the image display. Therefore, the reference value D of illuminance is easily changed from the second reference illuminance D2 to the first reference illuminance D1, for example, when the projector 1 is moved to another room or when the illuminance in the room A1 changes with the lapse of time. Thus, the need for the user to manually reset the reference value D of illuminance is reduced.

B6: Sixth Modification Example

In the first embodiment and the first to fifth modification examples, the changer 152 may change the reference value D of illuminance from the second reference illuminance D2 to the first reference illuminance D1 after the end of the operation of controlling the brightness of the image B1 shown in FIG. 7 in the circumstance where the reference value D of illuminance is the second reference illuminance D2. The operation of controlling the brightness of the image B1 is an example of the processing of controlling the brightness of the image B1, based on the relationship between the second illuminance F2 and the second reference illuminance D2.

For example, the changer 152 changes the reference value D of illuminance from the second reference illuminance D2 to the first reference illuminance D1 in response to the operation device 13 accepting an operation-off operation of switching off the operation of controlling the brightness of the image B1 in the circumstance where the reference value D of illuminance is the second reference illuminance D2. Alternatively, the changer 152 changes the reference value D of illuminance from the second reference illuminance D2 to the first reference illuminance D1 in response to the operation device 13 accepting an operation-on operation after accepting the operation-off operation in the circumstance where the reference value D of illuminance is the second reference illuminance D2.

According to the sixth modification example, the reference value D of illuminance is reset when the operation of controlling the brightness of the image B1 is newly executed. Therefore, the influence of the past setting of the reference value D of illuminance on the newly executed brightness control operation can be reduced.

B7: Seventh Modification Example

In the first embodiment and the first to sixth modification examples, the positional relationship between the sensor 11 and the illumination device A3 changes with a change in the direction of the projector 1. The positional relationship between the sensor 11 and the illumination device A3 also changes with a movement of the projector 1. As the positional relationship between the sensor 11 and the illumination device A3 changes, the illuminance F represented by the illuminance signal C1 from the sensor 11 changes. Therefore, the changer 152 may reset the reference value D of illuminance in response to the change in the direction of the projector 1. The changer 152 may also reset the reference value D of illuminance in response to the movement of the projector 1.

Figure 11:
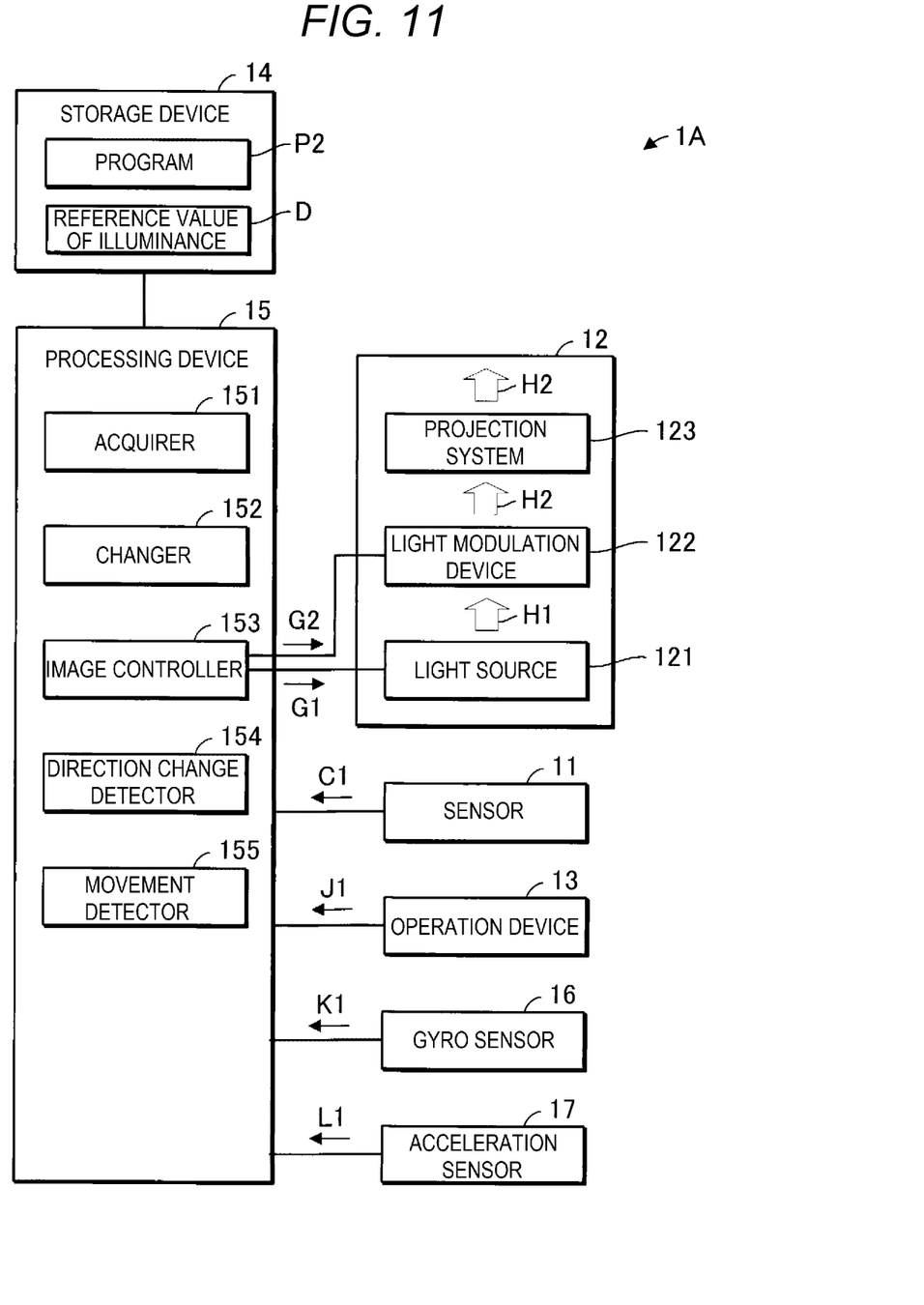
FIG. 11 shows a projector 1A according to a seventh modification example.

FIG. 11 shows a projector 1A according to the seventh modification example. Hereinafter, the projector 1A will be described mainly in terms of the difference from the projector 1 shown in FIG. 4.

The projector 1A includes a gyro sensor 16 and an acceleration sensor 17 in addition to the elements included in the projector 1 shown in FIG. 4.

The gyro sensor 16 is a sensor measuring the angular acceleration of the rotation of the projector 1A. The rotation of the projector 1A means the change in the direction of the projector 1A. The gyro sensor 16 generates a rotation signal K1, based on the result of the measurement of the angular acceleration of the projector 1A. The rotation signal K1 is a signal representing the rotation of the projector 1A. The change in the direction of the projector 1A is detected, based on the rotation signal K1.

The acceleration sensor 17 is a sensor measuring the acceleration of the projector 1A. The acceleration sensor 17 generates an acceleration signal L1, based on the result of the measurement of the acceleration of the projector 1A. The acceleration signal L1 is a signal representing the acceleration of the projector 1A. The movement of the projector 1A is detected, based on the acceleration signal L1.

The storage device 14 stores a program P2 instead of the program P1. The processing device 15 reads the program P2 from the storage device 14. The processing device 15 executes the program P2 and thus functions as the acquirer 151, the changer 152, the image controller 153, a direction change detector 154, and a movement detector 155. At least one of the acquirer 151, the changer 152, the image controller 153, the direction change detector 154, and the movement detector 155 may be formed of a circuit such as a DSP and an ASIC.

The direction change detector 154 detects the change in the direction of the projector 1A, based on the rotation signal K1. For example, when the rotation signal K1 represents the rotation of the projector 1A, the direction change detector 154 detects that the direction of the projector 1A is changed.

In the circumstance where the projector 1A has a geometric correction function for correcting a keystone distortion of the image B1, geometric correction tends to be used when the direction of the projector 1A is changed. Therefore, the direction change detector 154 may detect that the direction of the projector 1A is changed when the projector 1A performs geometric correction.

In the case where the projector 1A has selectable installation modes of "suspension from the ceiling" and "placement on the floor", "suspension from the ceiling" is selected as the installation mode when the projector 1A is suspended from the ceiling, and "placement on the floor" is selected as the installation mode when the projector 1A is placed on the floor. Therefore, the direction change detector 154 may detect that the direction of the projector 1A is changed, in response to the change in the installation mode. The up-down direction of the image B1 is reversed in response to the change in the installation mode.

The movement detector 155 detects the movement of the projector 1A, based on the acceleration signal L1. For example, when the acceleration signal L1 represents the acceleration of the projector 1A, the movement detector 155 detects that the projector 1A is moved.

The changer 152 changes the reference value D of illuminance from the second reference illuminance D2 to the first reference illuminance D1 in response to the detection of the change in the direction of the projector 1A by the direction change detector 154 in the circumstance where the reference value D of illuminance is the second reference illuminance D2.

In this case, the reference value D of illuminance can be changed from the second reference illuminance D2 to the first reference illuminance D1 in response to the change in the direction of the projector 1A.

Also, the changer 152 automatically changes the reference value D of illuminance from the second reference illuminance D2 to the first reference illuminance D1 in response to the detection of the movement of the projector 1A by the movement detector 155 in the circumstance where the reference value D of illuminance is the second reference illuminance D2.

In this case, the reference value D of illuminance can be automatically changed from the second reference illuminance D2 to the first reference illuminance D1 in response to the movement of the projector 1A.

The changer 152 may also change the reference value D of illuminance from the second reference illuminance D2 to the first reference illuminance D1 corresponding to the direction of the projector 1A in response to the detection of the change in the direction of the projector 1A by the direction change detector 154 in the circumstance where the reference value D of illuminance is the second reference illuminance D2.

In this case, the reference value D of illuminance can be changed to the first reference illuminance D1 that is optimum for the direction of the projector 1A.

What is claimed is:

1. A non-transitory computer-readable storage medium having a program embedded thereon, the program executing functions comprising:
   acquiring an output signal from a sensor detecting an illuminance in an environment where a display device is arranged;
   in a case where a first illuminance specified based on the output signal when a reference value of the illuminance in the environment is a first reference illuminance is higher than the first reference illuminance, changing the reference value from the first reference illuminance to a second reference illuminance that is higher than the first reference illuminance; and
   controlling a brightness of an image displayed on a display surface by the display device, based on a relationship between a second illuminance specified based on the output signal when the reference value is the second reference illuminance, and the second reference illuminance.

2. The non-transitory computer-readable storage medium according to claim 1, wherein
   when the first illuminance is equal to or higher than a third reference illuminance that is higher than the first reference illuminance, the second reference illuminance is the third reference illuminance, and
   when the first illuminance is higher than the first reference illuminance and lower than the third reference illuminance, the second reference illuminance is an illuminance between the first reference illuminance and the third reference illuminance.

3. The non-transitory computer-readable storage medium according to claim 1, wherein
   the second reference illuminance is the first illuminance.

4. The non-transitory computer-readable storage medium according to claim 1, the program executing functions comprising:
   detecting a change in a direction of the display device; and
   when the reference value is the second reference illuminance, changing the reference value from the second reference illuminance to the first reference illuminance in response to the detection of the change in the direction.

5. The non-transitory computer-readable storage medium according to claim 1, the program executing functions comprising:
   when the reference value is the second reference illuminance, changing the reference value from the second reference illuminance to the first reference illuminance in response to a power-on or a power-off of the display device.

6. The non-transitory computer-readable storage medium according to claim 1, the program executing functions comprising:
   when the reference value is the second reference illuminance, changing the reference value from the second reference illuminance to the first reference illuminance in response to a start of display of the image or a stop of the display of the image.

7. The non-transitory computer-readable storage medium according to claim 1, the program executing functions comprising:

changing the reference value from the second reference illuminance to the first reference illuminance after controlling the brightness of the image.

8. The non-transitory computer-readable storage medium according to claim 1, the program executing functions comprising:
   detecting a movement of the display device; and
   when the reference value is the second reference illuminance, changing the second reference illuminance to the first reference illuminance in response to the detection of the movement.

9. The non-transitory computer-readable storage medium according to claim 1, wherein
   the controlling the brightness of the image includes:
   setting one or more thresholds, based on the second reference illuminance; and
   controlling the brightness of the image, based on a high-low relationship between the one or more thresholds and the second illuminance.

10. A display device comprising:
    a sensor outputting an output signal representing an illuminance in an environment; and
    a processing device executing:
       in a case where a first illuminance specified based on the output signal when a reference value of the illuminance in the environment is a first reference illuminance is higher than the first reference illuminance, changing the reference value from the first reference illuminance to a second reference illuminance that is higher than the first reference illuminance; and
       controlling a brightness of an image displayed on a display surface, based on a relationship between a second illuminance specified based on the output signal when the reference value is the second reference illuminance, and the second reference illuminance.

* * * * *